United States Patent [19]
Gilmour et al.

[11] Patent Number: 5,436,872
[45] Date of Patent: Jul. 25, 1995

[54] TIME DELAY-PHASE SHIFT COMBINATION BEAMFORMER

[75] Inventors: John E. Gilmour, Richland Township, Allegheny County, Pa.; Thomas J. Hartka, Severna Park, Md.

[73] Assignee: Westinghouse Elec Corp, Pittsburgh, Pa.

[21] Appl. No.: 266,395

[22] Filed: Jun. 27, 1994

[51] Int. Cl.⁶ .............................. G01S 15/00
[52] U.S. Cl. ........................................ 367/103
[58] Field of Search .............. 367/103, 105, 7, 88; 73/625, 626; 128/661.01

[56] References Cited
U.S. PATENT DOCUMENTS
4,387,597  6/1983  Brandestini .......................... 73/626

OTHER PUBLICATIONS

Hybrid time-delay/phase-shift digital beamforming for uniform collinear arrays by Gabel and Kurth, Sperry Research Center, Sudbury, Mass.; Journal of Acoustical Society of America, vol. 75, No. 6, Jun., 1984.

True Time-Delay Bandpass Beamforming, Horvat, Bird and Goulding; IEEE Journal of Oceanic Engineering, vol. 17, No. 2, Apr., 1992.

Primary Examiner—Daniel T. Pihulic

[57] ABSTRACT

A time delay-phase shift combination beamformer for applications where the required time delays for time delaying the received signal to achieve coherency exceed the reciprocal of the incoming signal's bandwidth, and having a time delay stage for coarse beamforming at a particular range and first beam direction and a phase shift stage for fine beam steering in a second direction at the particular range.

5 Claims, 4 Drawing Sheets

TIME DELAY-PHASE SHIFT COMBINATION BEAMFORMER

BACKGROUND OF THE INVENTION

The present invention relates to beamforming techniques to be used in the near-field of an array for active sonar applications.

Modern radars and sonars having multi-element arrays to receive an incoming signal that has a high signal to noise ratio. Beamforming refers to techniques for electronically focusing and steering the beam formed by the multi-element arrays in the direction of the incoming signal so as to maximize the reception of the incoming signal.

Each element of the array receives the incoming signal. Depending on the range and direction of the source radiating the signal, the geometry of the array, and the bandwidth of the incoming signal, each element may receive the incoming signal at a different time. To compensate for this time difference in reception, each element's received signal must be aligned in time corresponding to the desired range and direction, before summing the individual received signals. Such a process ensures the received signals are coherent before summing. Such time compensation can be accomplished by delaying the received signal of each element by a proper time delay before summing.

To illustrate the importance of coherency in achieving maximum reception of the incoming signal, if N coherent equal amplitude received signals are added together, the sum is N times greater than the amplitude of one received signal. If N incoherent equal amplitude received signals are added, the sum will be less than N times the amplitude of one signal and, possibly, zero.

Not only does coherency among the received signals maximize the reception of the incoming signal, but also, because noise is by nature incoherent, the lack of coherency among received noise reduces the reception of noise. Correspondingly, the sum of N equal noise measurements is the square root of N times the one noise measurement.

Consequently, beamformers have a signal to noise gain because of the coherency of time-delayed received signals and the incoherency of noise. If the incoming signal received by N elements of an array is coherent, a signal to noise gain will increase by a factor of N divided by the square root of N.

Moreover, other advantages are achieved by time delaying the received signals to achieve coherency among them. A correlated signal as well as incoming signal may be received by the array. The time delays, however, are appropriate for achieving coherency of received signals, which may not achieve coherency for received correlated signals. Thus, an incoming signal to correlated signal gain occurs because the reception is maximized for the incoming signal but not the correlated signal. Furthermore, shading of the arrays, which reduces sidelobes that are pointing in the direction of the correlated signal or source, can improve the incoming signal to correlated signal gain, but at the expense of reducing the incoming signal to noise gain.

There are three known basic beamformer types for achieving coherency among the received signals of each element: true time delay, delay interpolate, and phase shift. A true time delay beamformer samples the received signal at a fixed rate higher than necessary for the proper time delay for beamforming. This results in an unnecessary amount of sampling. Any proper time delay may be applied by selecting a set of samples corresponding to the proper time delay out of all the samples taken. Alternatively, the sampling rate may be adjustable to achieve a set of samples for a particular time delay necessary for beamforming, hence, avoiding unnecessary samples.

Second, a delay interpolate beamformer is similar to a true time delay beamformer except received signals are sparsely sampled. Because of the sparse sampling, the appropriate set of samples may not exist that are necessary for applying the proper time delay. To remedy this, the appropriate set of samples are estimated by interpolating between the two closest sets of actual samples.

Last, a phase shift beamformer assumes that the amplitude and phase of the received signal has a constant frequency and maximum amplitude during the proper delay time. Accordingly, the received signal's amplitude and phase at the time delay is derived by phase shifting. That is, the received signals are phase-shifted by an amount equal to the proper time delay multiplied by the assumed frequency of the incoming signal.

All conventional art is simply modifications of these three basic schemes.

The selection of beamformer type for a particular application is influenced by the lowest system cost in terms of dollars, space, and/or power for a given level of performance. For conventional state-of-the-art beamformers using digital computation techniques, lowest system cost means finding the most computationally efficient method—computational efficiency being mainly determined by the number of multiplications.

For example, in the case of a small aperture array receiving a narrow band incoming signal, phase shift beamforming is an efficient method because a Fast Fourier Transform (FFT) algorithm can process the received signals with a relatively low number of multiplications.

Phase shift beamforming, however, is not adequate for large aperture arrays receiving a broadband incoming signal, an example of such is seen in FIG. 1, when the reciprocal of the incoming signal's bandwidth exceeds the proper time delays required to achieve coherence among the received signals of the elements. In these situations, mainlobe spreading and high level sidelobes occur because the amplitude and phase of one received signal of an incoming signal cannot be correlated with the amplitude and phase of another received signal of the same incoming signal.

For broadband incoming signals, the prior art has not established a satisfactory solution. True time delay beamformers are always applicable, but rarely employed because the large number of samples that must be taken and stored is too costly.

Most attempts to achieve a computationally efficient method for broadband incoming signals have involved sampling at the Nyquist rate of the system bandwidth, which is dependent on the bandwidth of the transmitted signal and received signal, or higher, and interpolators for interpolating between samples, as needed. A beamformer using this method is described in Harvat, Bird, Goulding, "True Time-Delay Beamforming," *IEEE Journal of Oceanic Engineering*, Vol. 17, No. 2, April 1992. This method is computationally intense compared to the efficient FFT algorithms used in the phase shift beamformer. Recognizing the inherent computational disadvantage of this method, conventional art has tried to formulate hybrid beamformers, which combine interpolator based sections and phase shift sections to partially regain some of the computational advantage of a pure phase shift beamformer, as described in Gabel, Kierth, "Hybrid Time-Delay/Phase-Shift Digital Beamforming for Uniform Collinear Arrays," *J. Acoust. Soc. Am.*, June 1984.

The particular problem giving rise to the solution provided by the present invention is a high resolution Side Looking Sonar (SLS) array requiring time delays that exceeded the reciprocal of the incoming signal's bandwidth by a factor of two. A simple phase shift beamformer could not be used because of the short duration of the incoming signal and the large aperture of the array. As a result, the incoming signal passes beyond the center elements of the array before it arrives at the end elements of the array.

SUMMARY OF THE INVENTION

The present invention is a hybrid beamformer of a unique design. It combines a time delay stage for coarse beamforming to achieve a desired focus range and direction and a phase shift stage for fine beamsteering in a direction at the focused range. This results in a hybrid beamformer in situations where a more computationally intense delay-by-interpolation technique would normally be used.

The object of the invention is to achieve a computationally efficient apparatus and method for beamforming with little or no reduction in performance over conventional art beamformers.

Another object of this invention is to provide an apparatus and method for achieving high performance beamforming in an application where the required time delays exceed the reciprocal of the incoming signal's bandwidth.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention provides a beamformer for a sonar system comprising a time-delay stage for coarse beamforming by sampling the in-phase and quadrature components of an incoming signal received by a plurality of array elements such that the samples are time delayed by a predetermined amount corresponding to the delay in arrival time of the wavefront of the incoming signal of an array element relative to center array element, and a phase shift stage for fine beam steering, coupled to the time delay stage, for phase shifting by a predetermined phase corresponding to a particular beam direction and then summing the samples corresponding to a common wavefront.

It is to be understood that both the foregoing general description and the following detailed description are exemplary and explanatory only and are not restrictive of the invention, as claimed.

The accompanying drawings which are incorporated in and constitute a part of the specification, illustrate one embodiment of the invention and together with the description serve to explain the principles of the invention.

DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

The present invention is a beamformer having a time delay stage for coarse beamforming by sampling and time-delaying the samples of the received signal and having a phase shift stage for fine beam steering by phase shifting these time delayed samples.

Figure 2:
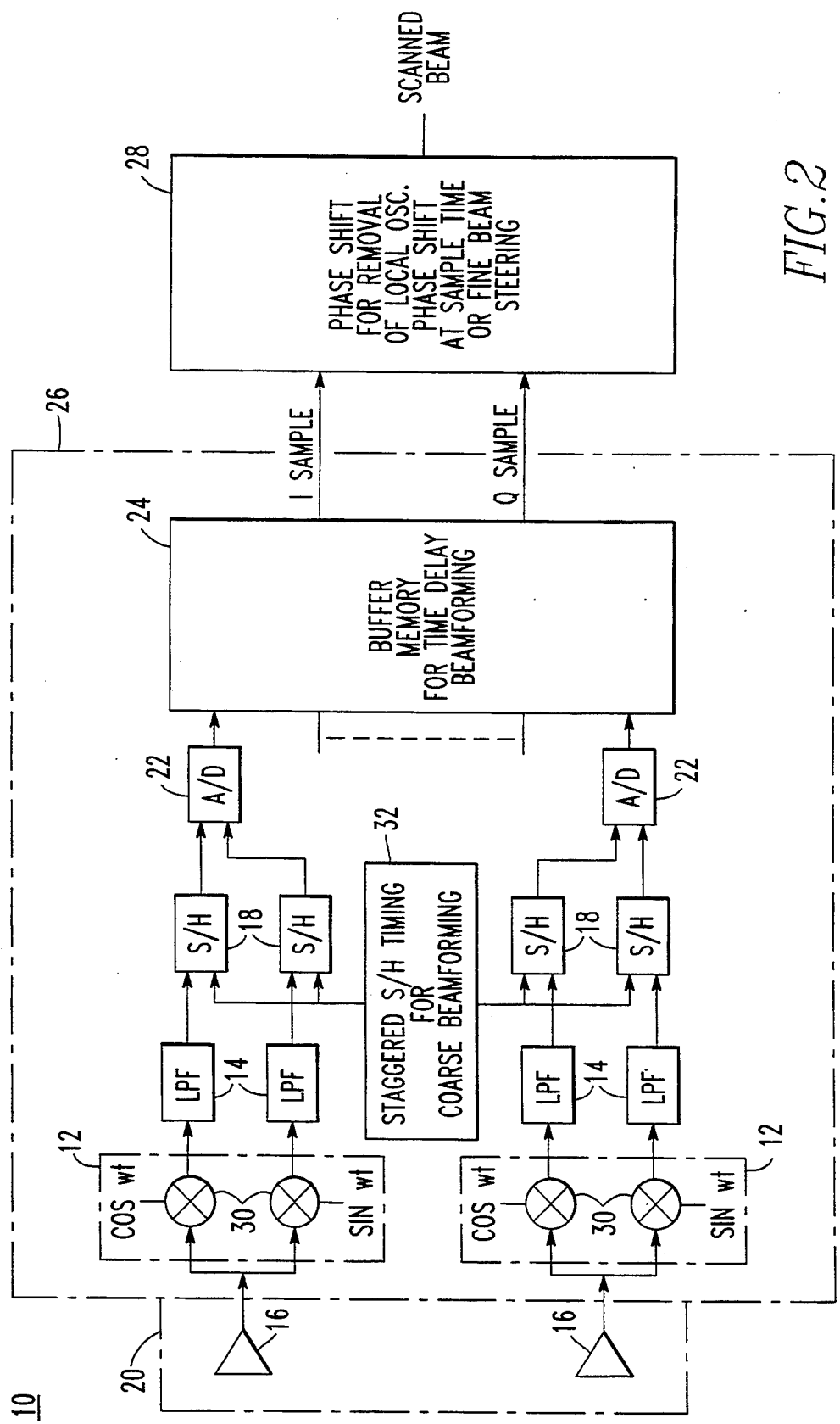
FIG. 2 is a block diagram showing the preferred embodiment of the time delay-phase shift combination beamformer of the present invention.

As seen in the block diagram of FIG. 2, an embodiment of the beamformer 10 of the present invention has a time delay stage 26 and phase shift stage 28. Also shown is an array 20.

Array 20 includes a plurality of elements 16 for receiving an incoming signal, correlated signals, and noise. The received signal of each of the plurality of element 16 is transmitted to the time delay stage 26.

Time delay stage 26 has two parallel channels for receiving each received signal. The first channel processes the in-phase ("I") component of the received signal; the second channel process the quadrature component ("Q") of the received signal. Each channel includes a local oscillator 30, low pass filter 14, and sample and hold circuit 18 coupled in a series connection. The two channels are coupled to a common analog to digital (A/D) converter 22 for each set of parallel channels. Each A/D converter 22 is commonly connected to a buffer memory 24 for holding the sampled and time-delayed I and Q components of each received signal.

Further, the time delay stage 26 includes a common timing circuit 32 for controlling the sample and hold circuits 18. Finally, the buffer memory 24 is coupled to the phase shift stage 28 that receives the I and Q components transmitted from buffer memory 24.

Figure 1:
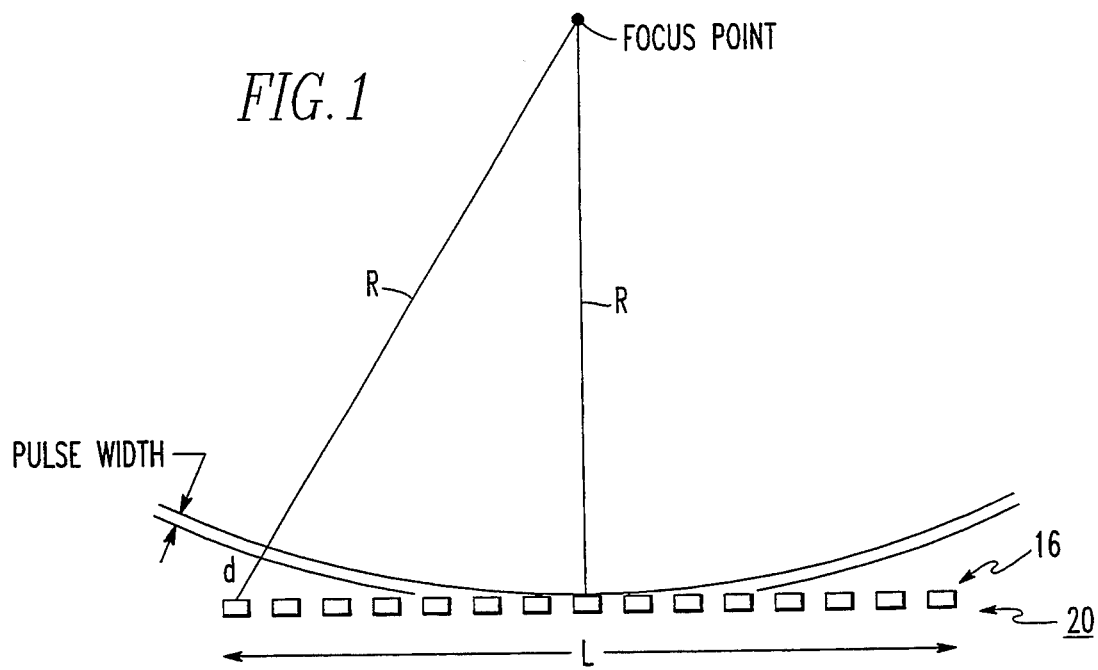
FIG. 1 is a diagram illustrating proper time delays required for beamforming which exceed the reciprocal of the incoming signal's bandwidth.

In operation, in-phase and quadrature components of the received signal are mixed with a signal of the mixer 12 and then the mixed I and Q components are filtered by low pass filter 14. The low pass filtering may be performed by analog techniques. These I and Q components are then sampled by the sample and hold circuit 18 at a rate corresponding to the proper time delay to focus and steer the beam of the array to the desired range and direction. For example, in FIG. 1, where the focus point is directly over the center element of the array, the proper time delay for an end element is given by the expression $d/c$, where c is the speed of sound and d is approximately given by the expression $L^2/8R$, where L is the length of the array and R is the range to the focus point.

After the time staggered samples are taken and held, they are converted to digital values by the A/D converters 22, held in the buffer memory 24, and finally transmitted to phase shifter 28.

Figure 3:
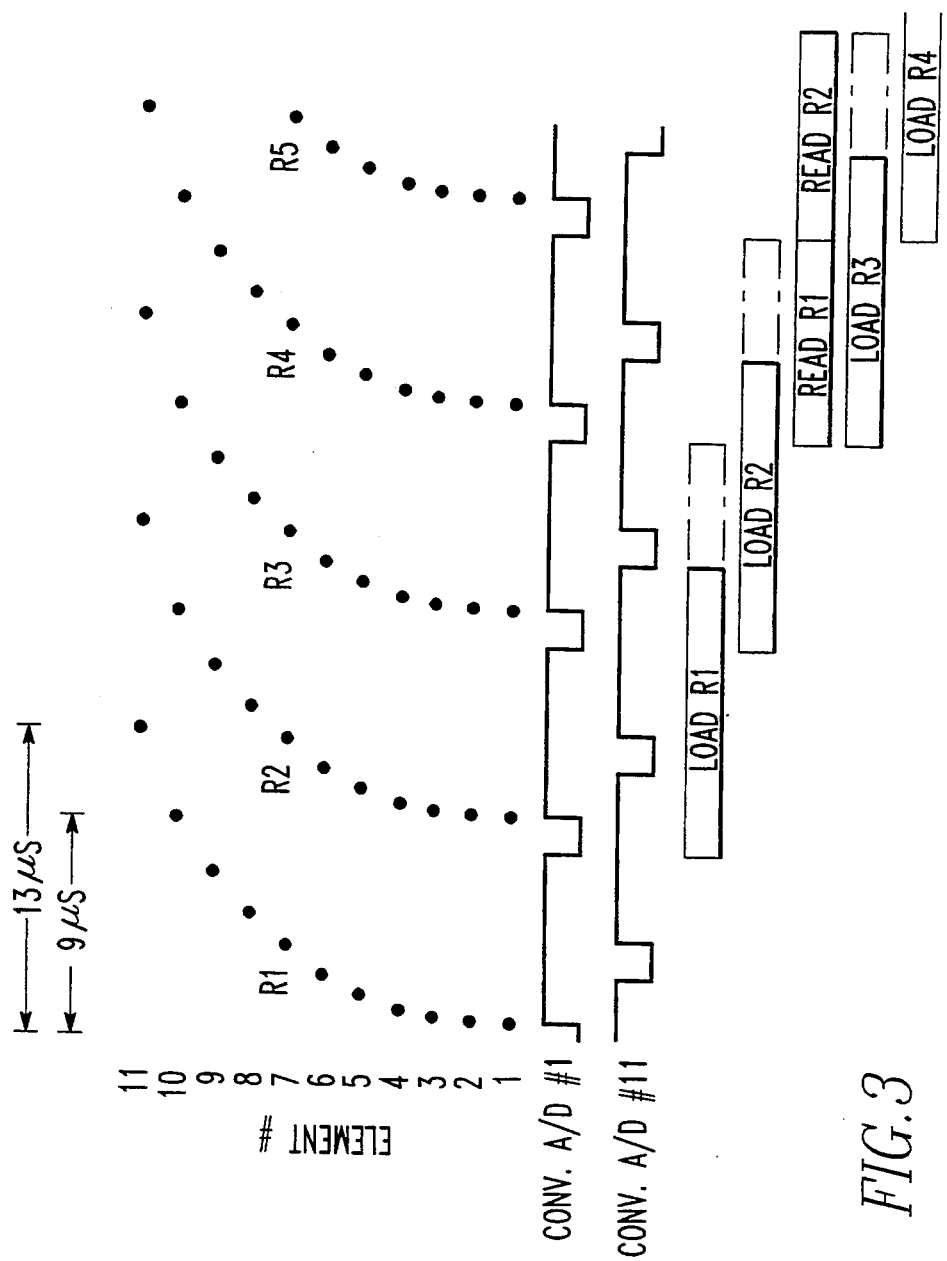
FIG. 3 is a timing diagram showing the sampling of the in-phase and quadrature components of the received signal as performed by the time delay stage of the present invention.

FIG. 3 illustrates the sampling performed by the time delay stage 26. The element number is the position of the element 16 relative to the center of the array 20. For purposes of the illustration, there are twenty-two elements 16, eleven on each side (only eleven are shown). The proper time delay for sampling is the delay in arrival time of the wavefront of the incoming signal at each element 16. For example, as seen in the example of FIG. 3, element number ten and eleven require time delays of 9 microseconds and 13 microseconds, respectively.

Because of the array's geometry and the incoming signal's bandwidth, the first wavefront R1 is received by element numbers ten and eleven after the end of the sample period of A/D converter 1 (R1-1) of element number one. To compensate, the samples of the received signals of element numbers one through nine are delayed by loading them in buffer memory 24, and then the corresponding samples of elements ten and eleven that are taken after the end of the sample period R1-1 are loaded with this group. The associated samples of elements one through eleven, which correspond to first wavefront R1 and are loaded in buffer memory 24, are represented as LOAD R1 in FIG. 3. This complete set of samples can be read out as a group READ R1. Similarly, the procedure can be used for delaying the associated samples for wavefront R2, which are represented by LOAD R2 and READ R2, and wavefronts R3, R4, and R5, and other ensuing wavefronts.

As the range of the target increases and the wavefront flattens, the wavefront R1 is received by all of the elements within the sample period R1-1 of element number one.

For fine beamsteering in a direction at the desired focus range, the phase shifter stage 28 can phase shift each sample by the proper time delay corresponding to a particular direction, and then all samples corresponding to a particular wavefront are summed. This phase shifting can be performed by a conventional phase shift beamformer. Because a conventional phase shift beamformer is used as the phase shift stage 28, the embodiment is illustrated as a box in FIG. 2.

The phase shift required for a certain time delay corresponding to a particular direction is expressed by the following equation:

$$\Delta \phi_{ji} = \frac{2\pi c (t_j - t_i)}{\lambda},$$

where,
$\Delta \phi_{ji}$ = the phase shift for element j relative to element i;
$t_j$ = time of arrival of the incoming signal at element j for a particular direction;
$t_i$ = time of arrival of the incoming signal at element i for a particular direction;
c = the speed of sound; and
$\lambda$ = the wavelength of the baseband signal, which is the output of mixer 12.

The present invention provides additional advantages, for example, only one A/D converter 22 as required for each element 16 regardless of the number of beams formed for different ranges and directions. Further, because the A/D converter 16 is operating on the baseband signal, it therefore can be a relatively slow, low powered device compared to an A/D converter operating on a carrier frequency, which is the center frequency of received signals, as required for a pure time delay beamformer. Also the computational method only requires the same number of multiplications as a pure phase shift beamformer.

Figure 4:
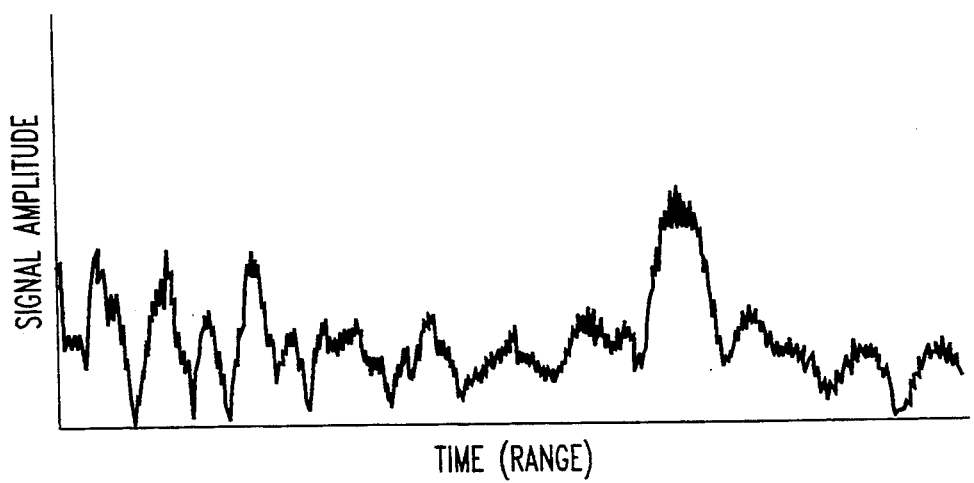
FIGS. 4, 5, and 6 illustrate the signal amplitude versus range for three different frequencies as achieved in an implementation of the present invention.
Figure 5:
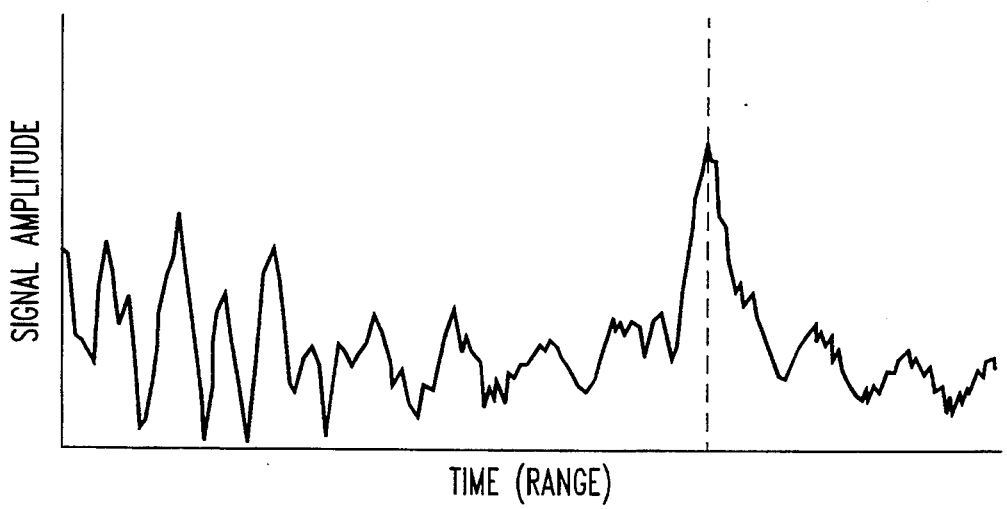
Figure 6:
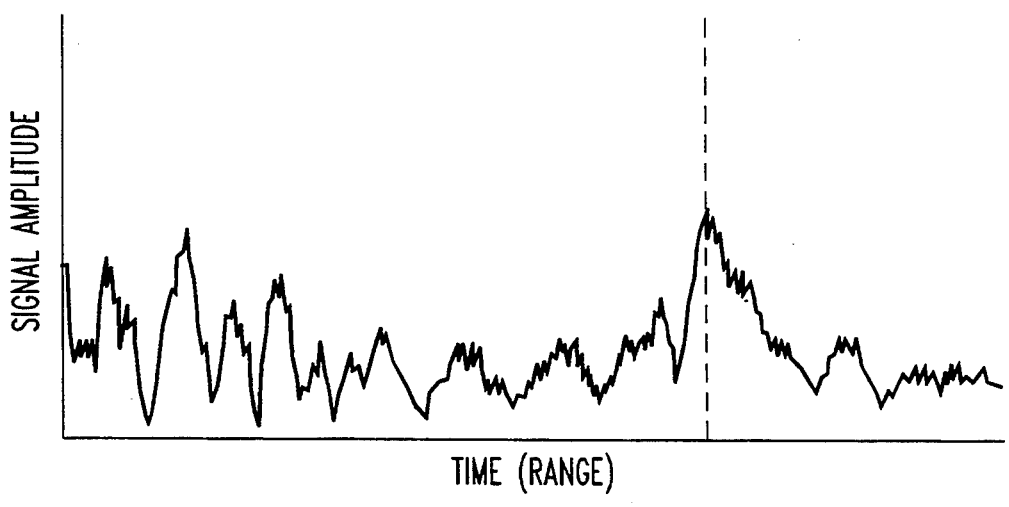

FIGS. 4 through 6 illustrate the results achieved by an implementation of the present invention for a high resolution side look sonar. The three figures show the signal level verses range for three different frequencies: the response for a center frequency of 1.1376 MHz is shown in FIG. 5; a frequency of 0.962 times the center frequency (1.0942 MHz) is shown in FIG. 4, and a frequency of 1.033 times the center frequency (1.1752 MHz) is shown in FIG. 6. A pure continuous wave signal was applied to twenty-two channels of the beamformer. The applied signal at each channel was time delayed the proper amount in the first stage to simulate different shaped wavefronts corresponding to a target at different ranges. As the beamformer 10 varied its point of focus, as it does to follow the transmitted pulse out in range, it eventually focuses at the range being simulated and, thus, the received signal level peaks. All properly working beamformers would show the same response when the carrier frequency of the received signal matches the bandwidth of the beamformer.

The three graphs show that with the present invention the signal level at the focused range only decreases because of the analog bandwidth of the system. The higher and lower frequencies used in the test were at the 3 dB points of the system's analog bandwidth.

In accordance with the invention, the present invention includes all the elements of the broadest claim.

It will be apparent to those skilled in the art that various modifications and variations can be made in the time delay bandpass beamformer of the present invention and in construction of this beamformer without departing from the scope or spirit of the invention.

Other embodiments of the invention will be apparent to those skilled in the art from consideration of the specification and practice of the invention disclosed herein. It is intended that the specification examples be considered as exemplary only, with a true scope and spirit of the invention being indicated by the following claims.

We claim:

1. A method of beamforming used in a sonar system, comprising the steps of:

receiving an incoming signal by an antenna having a plurality of array elements;

sampling the in-phase component and the quadrature component of each of the plurality of received signals;

time delaying each sample of the plurality of in-phase and quadrature components by an associated predetermined delay time, wherein the plurality of predetermined delay times correspond to a particular focus range and a general beam direction of the antenna;

phase shifting each of the time delayed samples by an associated predetermined phase, wherein the plurality of predetermined phases correspond to a fine beam direction of the antenna at the particular focus range and general beam direction of the antenna; and summing the time delayed and phase-shifted samples.

2. The method of beamforming recited in claim 1, further including the steps of:

mixing a reference signal to the received signals; and low pass filtering the received signals.

3. The method of beamforming recited in claim 1, wherein the time delaying step includes the substeps of:

loading into a buffer memory the time delayed samples; and reading out of the buffer memory the time delayed samples.

4. The method of beamforming recited in claim 1, wherein the plurality of predetermined phases is expressed by the following equation:

$$\Delta \phi_{ji} = \frac{2\pi c(t_j - t_i)}{\lambda},$$

where, $\Delta \phi_{ji}$ = the phase shift for an element j relative to an element i;

$t_j$ = time of arrival of the incoming signal at element j for the fine beam direction;

$t_i$ = time of arrival of the incoming signal at the element i for the fine beam direction;

c = the speed of sound; and $\lambda$ = the wavelength of the reference signal.

5. A beamformer for a sonar system, comprising:

a time-delay stage for coarse beamforming including, a plurality of a pair of channels for sampling the in-phase and quadrature components of an incoming signal received by a plurality of array elements such that the samples are time delayed by a predetermined amount corresponding to the delay in arrival time of the wavefront of the incoming signal of an array element relative to another array element for a particular focus range and first beam direction, each channel having a mixer for mixing a signal to the components, a low pass filter, and a sample and hold circuit, coupled in a series connection, a plurality of analog to digital converters, wherein one analog to digital converter is commonly coupled to a pair of parallel channels, a timing circuit, coupled to the plurality of sample and hold circuits, for controlling the sample and hold circuit, and a buffer memory, commonly coupled to the plurality of analog to digital converters for receiving the samples and sequentially loading the samples of each channel corresponding to a common wavefront; and a phase shift stage for fine beam steering, coupled to the buffer memory, wherein the phase shift stage includes a phase shift beamformer for phase shifting by a predetermined phase corresponding to a second beam direction at the particular focus range, and then summing the samples corresponding to a common wavefront.

* * * * *